Dec. 19, 1944.  D. L. CHANDLER ET AL  2,365,454
AUTOMOBILE WINDOW CONTROL
Filed May 21, 1942  14 Sheets-Sheet 3

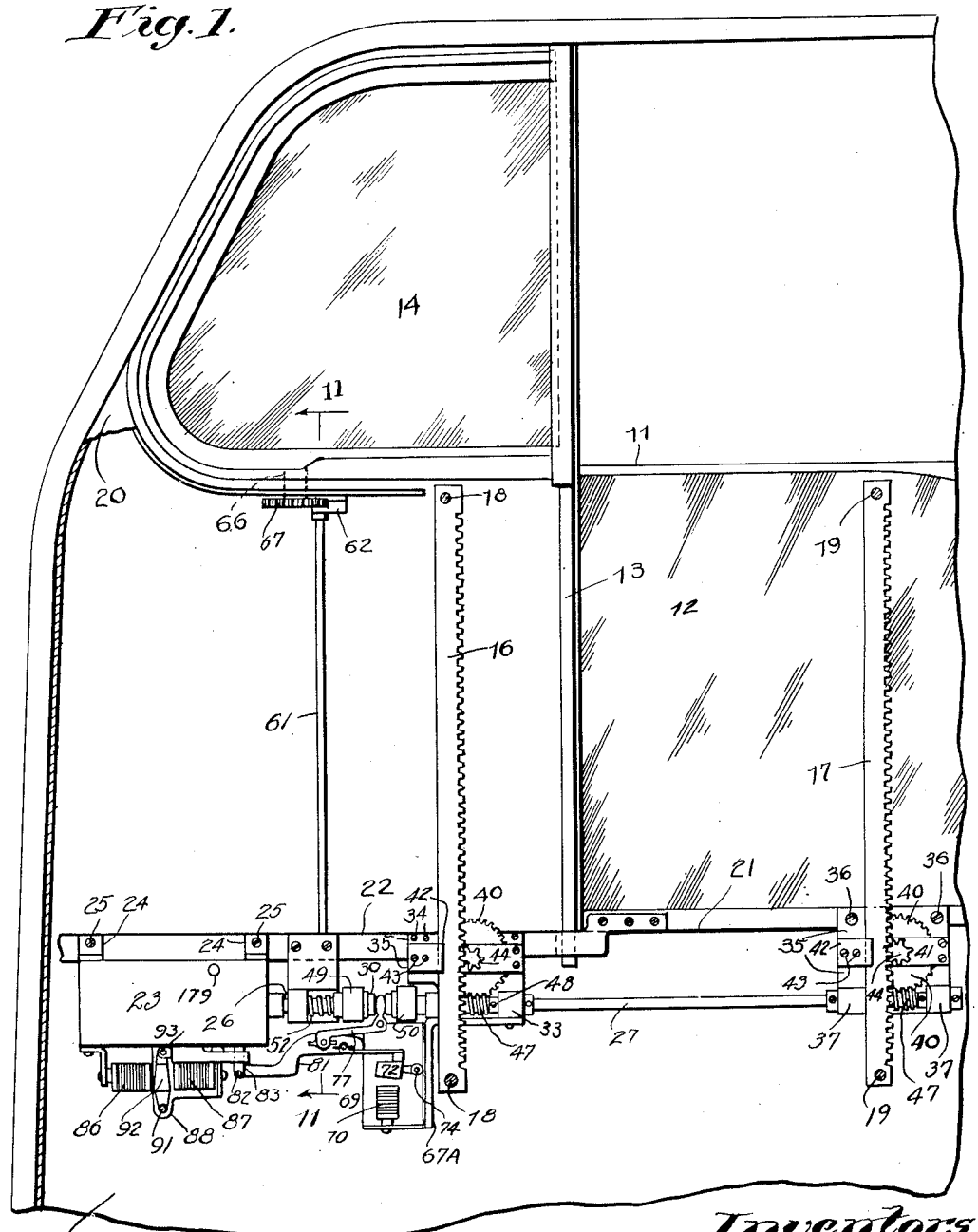

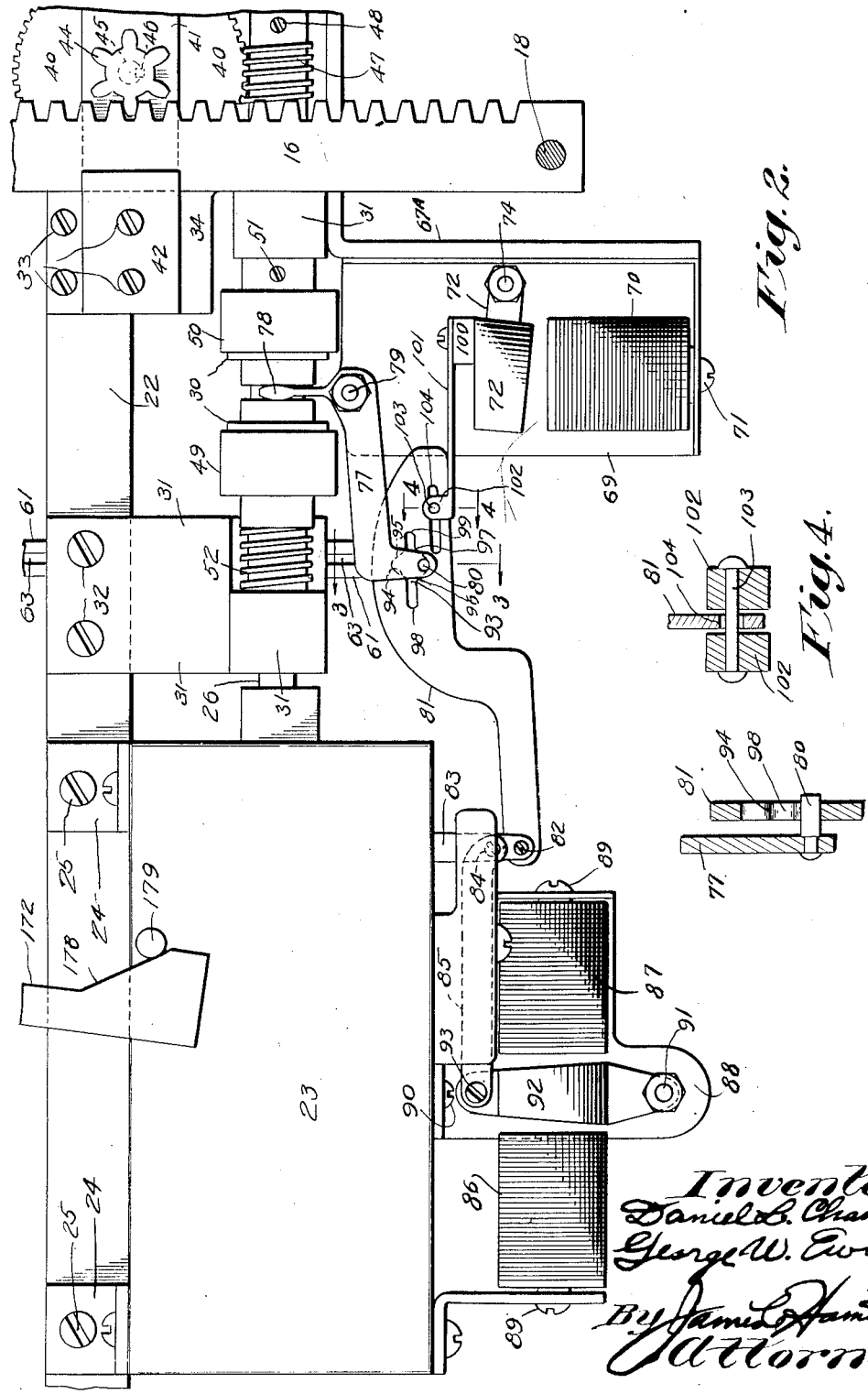

Inventors
Daniel L. Chandler.
George W. Ewing.
By James C. Hamilton
Attorney

Dec. 19, 1944.  D. L. CHANDLER ET AL  2,365,454
AUTOMOBILE WINDOW CONTROL
Filed May 21, 1942    14 Sheets-Sheet 4

Inventors
Daniel D. Chandler
George W. Ewing.
By James C. Hamilton
Attorney

Dec. 19, 1944.  D. L. CHANDLER ET AL  2,365,454
AUTOMOBILE WINDOW CONTROL
Filed May 21, 1942  14 Sheets-Sheet 5

Inventor
Daniel L. Chandler
George W. Ewing
By James C. Hamilton
Attorney

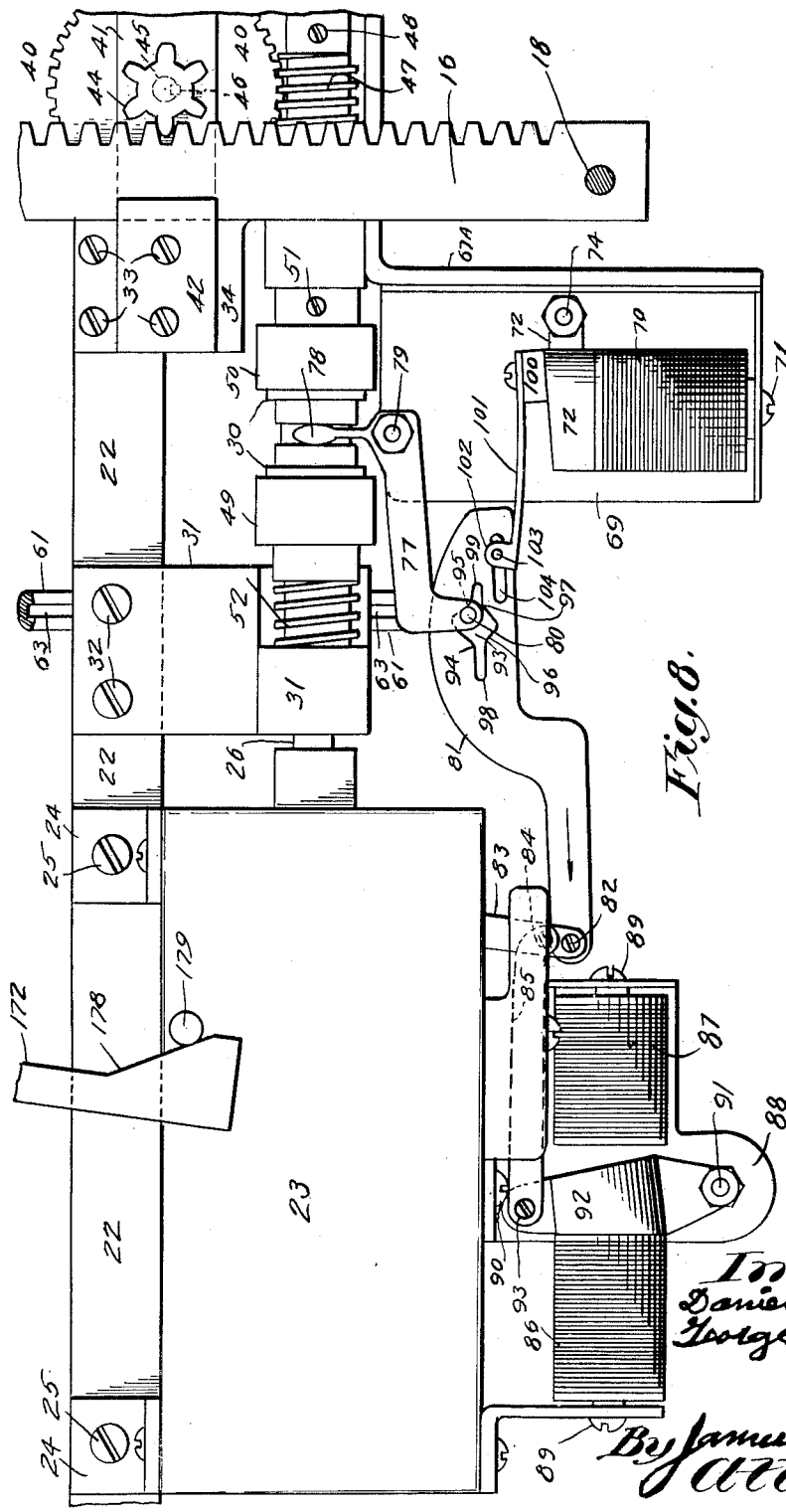

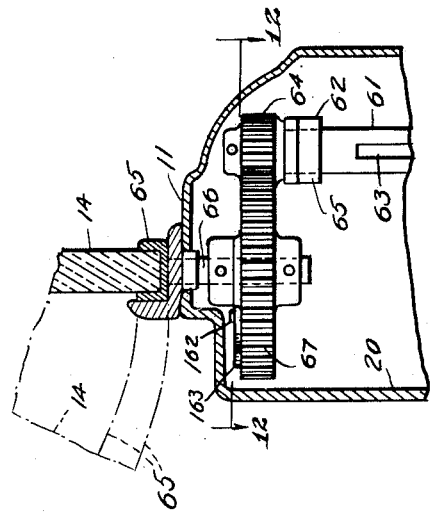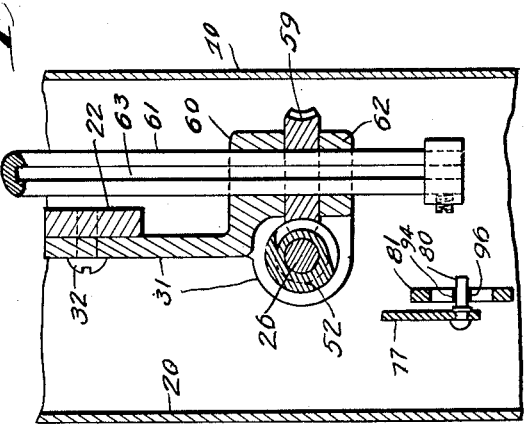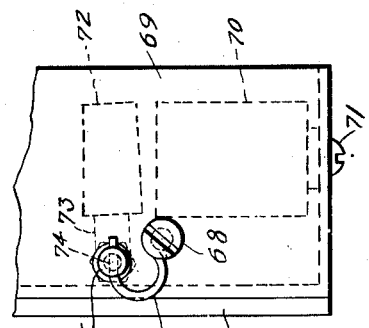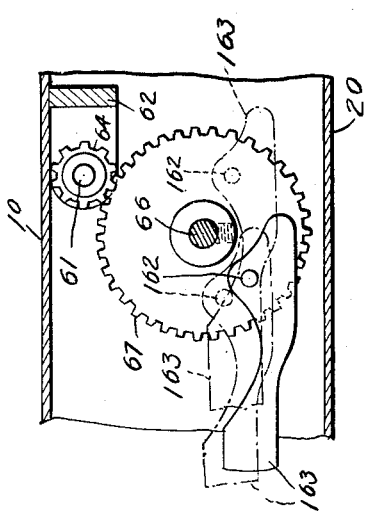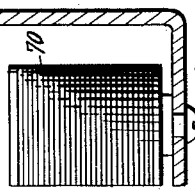

Dec. 19, 1944.  D. L. CHANDLER ET AL  2,365,454
AUTOMOBILE WINDOW CONTROL
Filed May 21, 1942   14 Sheets-Sheet 8
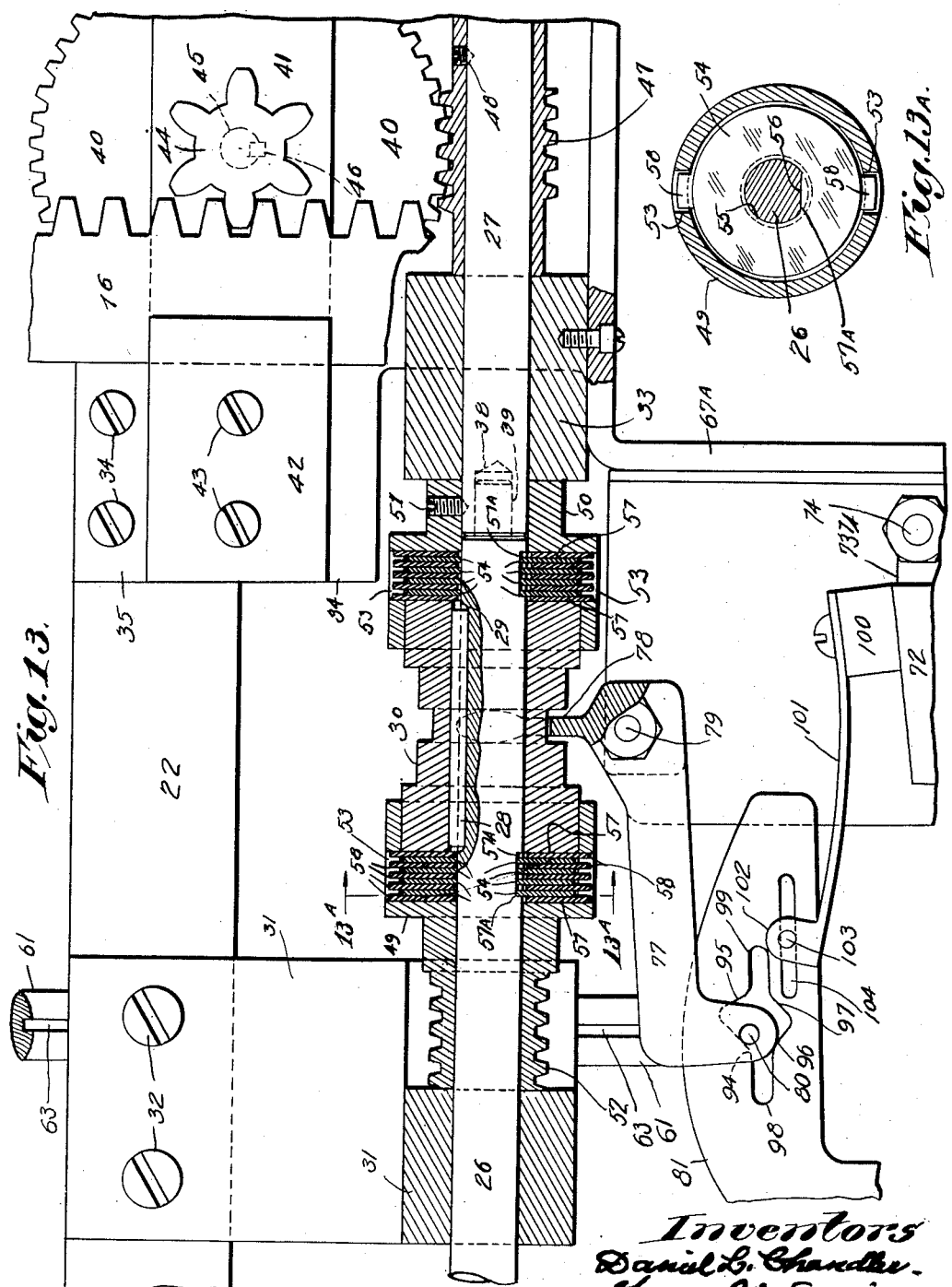
Inventors
Daniel L. Chandler
George W. Ewing
By James C. Hamilton
Attorney

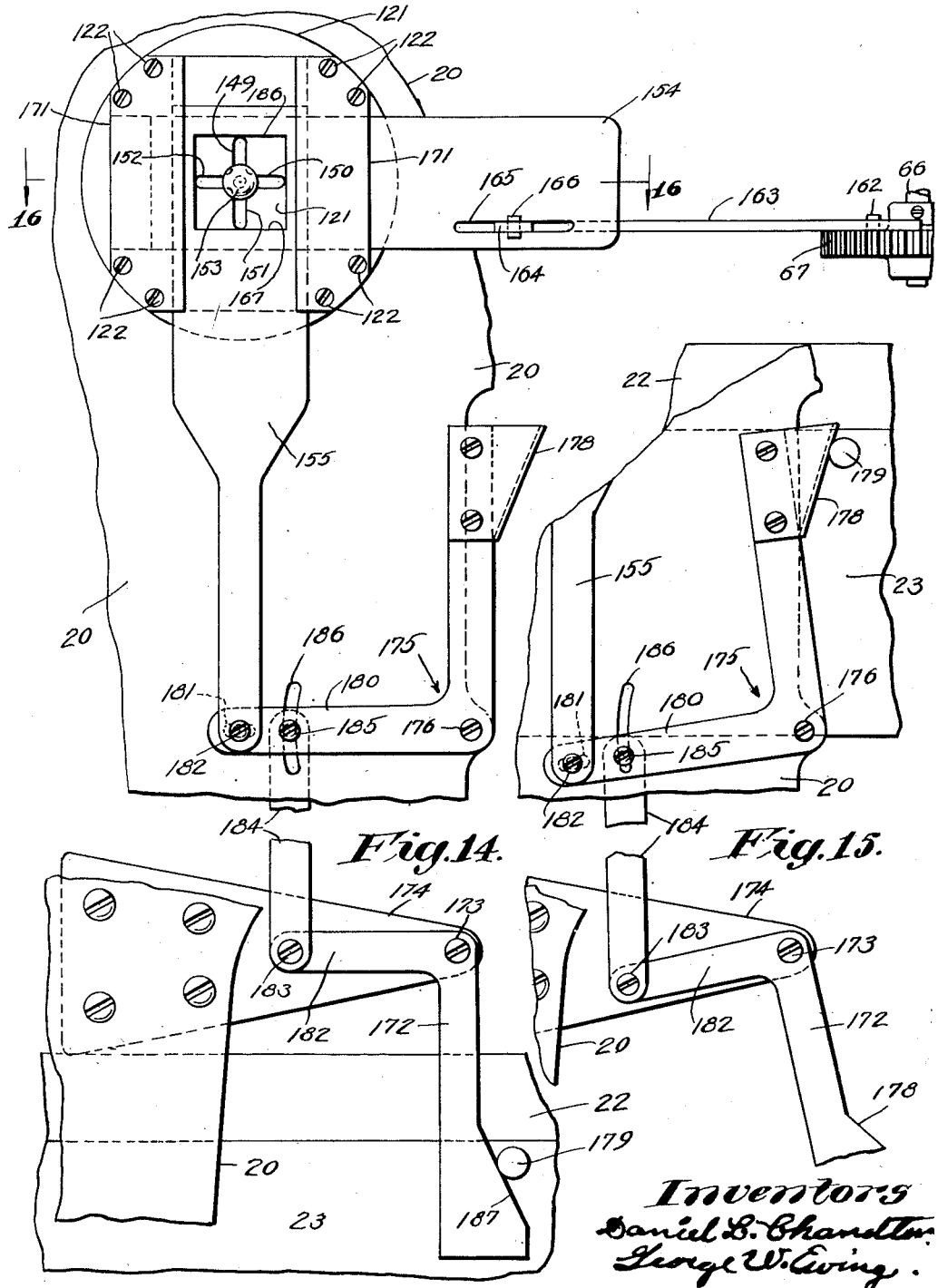

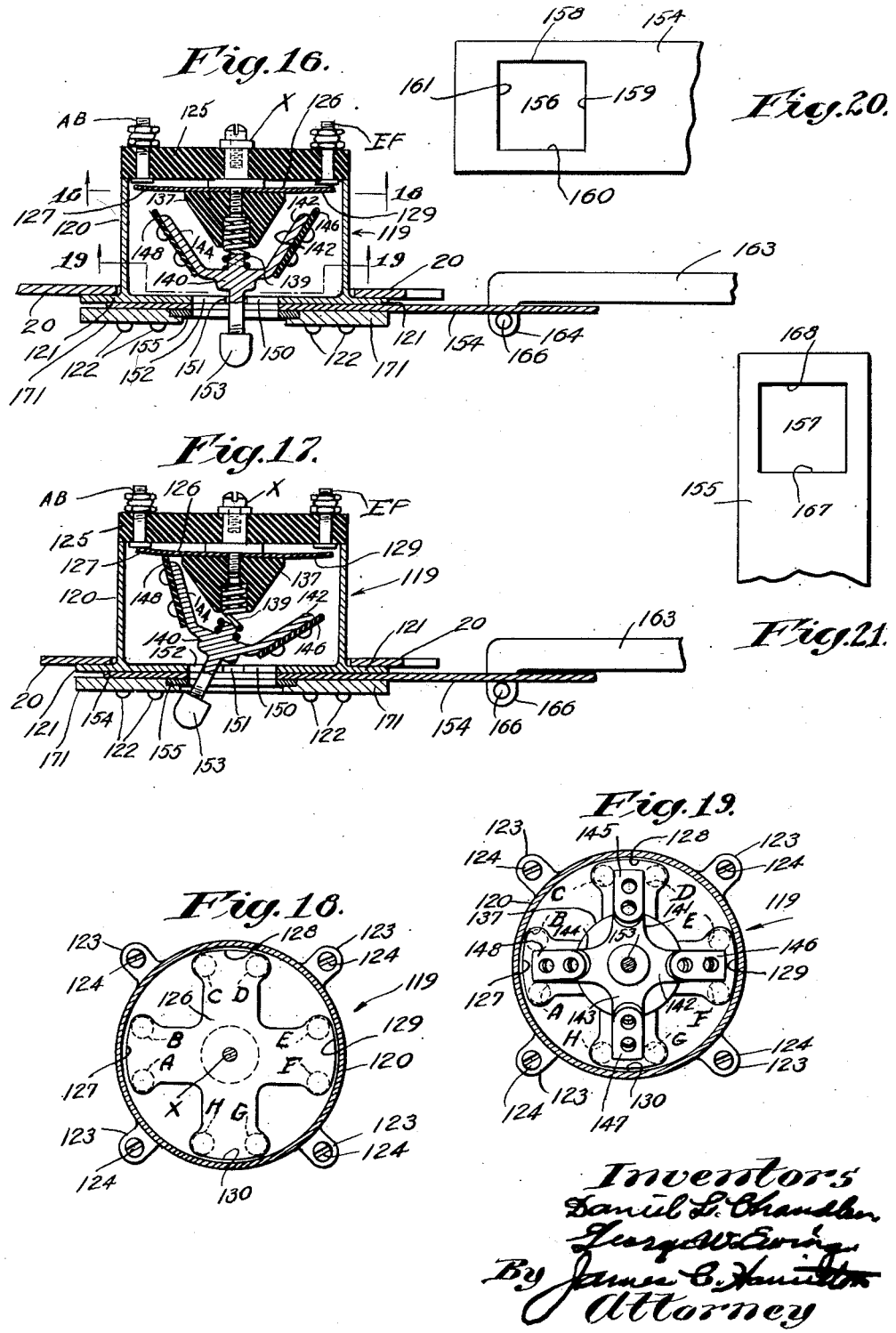

Dec. 19, 1944.  D. L. CHANDLER ET AL  2,365,454
AUTOMOBILE WINDOW CONTROL
Filed May 21, 1942  14 Sheets-Sheet 12
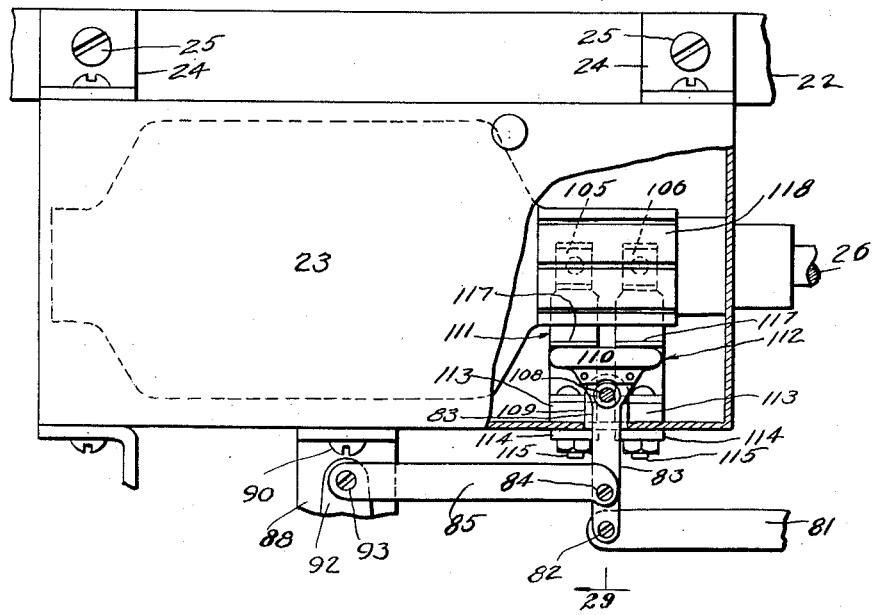
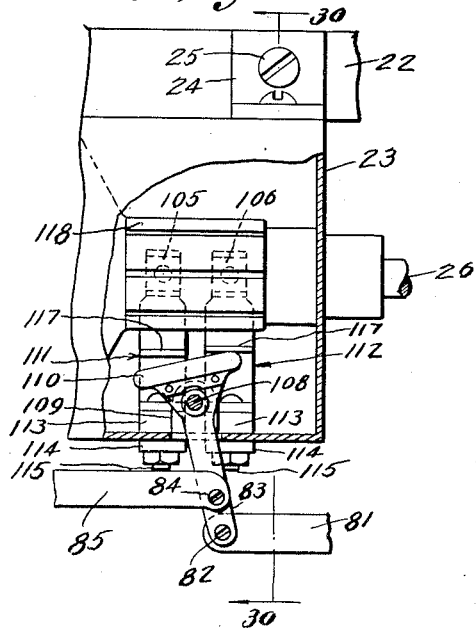
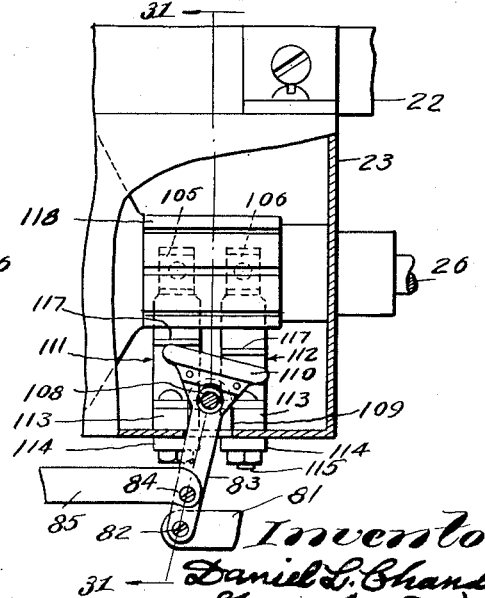
Inventors
Daniel L. Chandler
George W. Ewing
By James C. Hamilton
Attorney

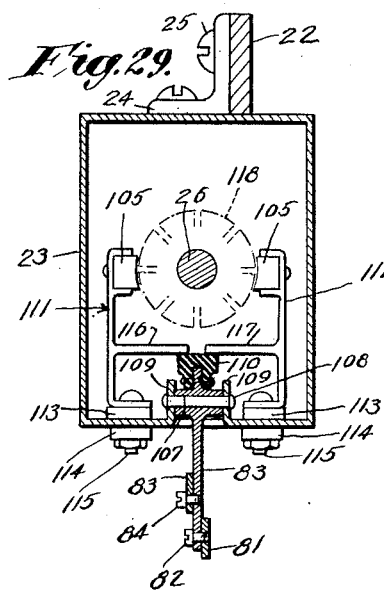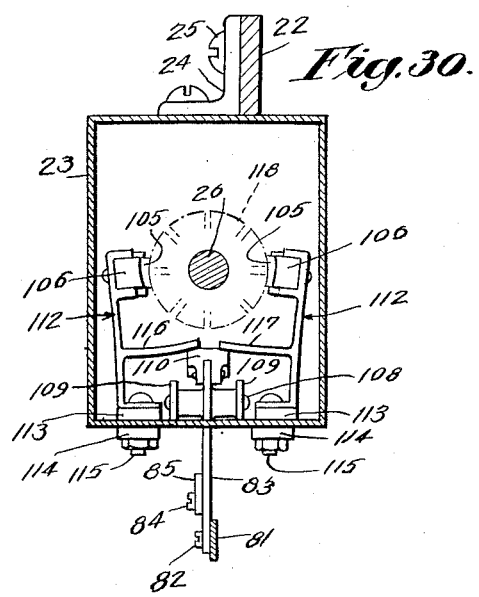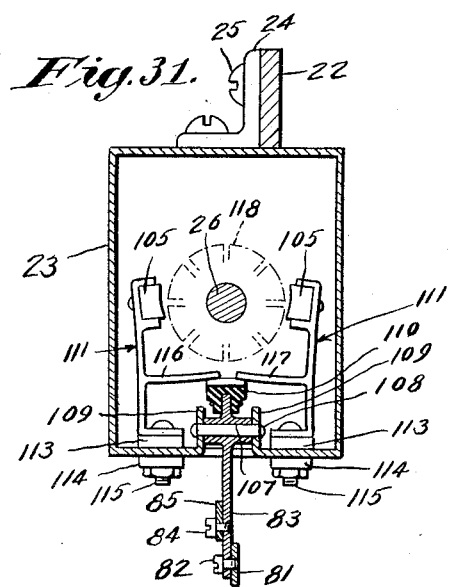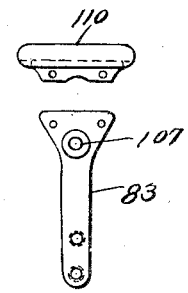

Dec. 19, 1944.  D. L. CHANDLER ET AL  2,365,454
AUTOMOBILE WINDOW CONTROL
Filed May 21, 1942  14 Sheets-Sheet 14

Inventors
Daniel L. Chandler
George W. Ewing
By James C. Hamilton
Attorney

Patented Dec. 19, 1944

2,365,454

UNITED STATES PATENT OFFICE 2,365,454

AUTOMOBILE WINDOW CONTROL

Daniel L. Chandler, Salem, and George W. Ewing, Peabody, Mass., assignors to Aresee Company Inc., Salem, Mass., a corporation Application May 21, 1942, Serial No. 443,994

6 Claims. (Cl. 268—124)

Our present invention relates to automobile door windows which are operated by means of electricity. More particularly our present invention is concerned with the electrical operation of automobile door windows which involves not only the raising and lowering of the window, but it also operates the swinging forward ventilator window provided in conventional windows in front automobile doors of many makes of automobiles.

Heretofore, it has been the practice to provide hand operated cranks, one for the main window, and one for the ventilator. Such attachments are not only unattractive on the inside of the automobile door but add more projecting elements on which to catch and tear the clothing of the operator when entering and leaving the vehicle. Also, these protruding attachments are not always placed in a position which is convenient to all persons who have to operate them.

The trend of design in modern automobiles has been toward automatic controls, many of which make use of electricity for their operating power.

In our present invention, we have designed an electrically operated window and ventilator mechanism which is operated by means of a single electrical switch lever such that the operator merely pushes the switch lever up, to raise the window, and down to close it, or, if he wishes, he may open the ventilator or close it by moving the switch to the left-hand side or the right-hand side, as the case may be.

The principal object of our invention is to provide an improved universal operating mechanism for automobile doors and the like for the purpose of raising and lowering the window pane and opening and closing the ventilator portion;

Another object is to provide an electrically operated automobile door window and ventilator mechanism, both of which may be operated from one common electrical switch lever located on the inner panel of the door;

Another object is to provide an electrically operated automobile window and ventilator control which is foolproof, in that the electrical current will be cut off at the electrical switch when the window or ventilator member reaches its limit even though the operator continues to hold the switch in a closed position, thereby making it impossible for the operator either accidentally or intentionally to damage the electrical equipment;

Another object is to provide an entire electrical driving mechanism for both the window and ventilator of an automobile door which is suspended to the sliding window member, thereby providing a more or less floating operating apparatus which is not subjected to the major shock and vibration to which automobile doors and windows are naturally subjected;

Another object of our invention is to provide an electrically operated window and ventilator mechanism for automobile doors, in which a single electrical motor may be used to reverse the direction of movement of either the ventilator or window pane, at the will of the operator;

Another object is to provide an electrically operated ventilator and door window for automobiles, in which the electrical current is not only open-circuited at the electrical switch but also at the electrical motor brushes when the apparatus is in a neutral position, thereby making it impossible for the electrical motor to operate accidentally unless the electrical switch is closed;

Still another object is to provide a positive electrical drive for the window ventilator and window pane which will prevent the window or ventilator from being forced by pressure exerted on either from the outside when either the ventilator or the window pane is left in a slightly open position for ventilation purposes when the vehicle is unattended, and Numerous other objects and novel features will be apparent in the operation and construction of our invention as the description also progresses, like numerals and characters referring to like parts as they occur throughout the specification and drawings.

In the drawings accompanying the description and claims, certain portions of the automobile door relating to well-known construction have been eliminated in the interest of simplification in which:

Fig. 1 illustrates an upper quarter fragment of an automobile door portions, such as the inner door panel, which have been broken away to show better the major portions of the apparatus which operate the window pane and the swinging ventilator, and in which it will be observed, that the main driving mechanism is carried on the window pane frame;

Fig. 2 is an enlarged fragmentary elevation of the electrical motor and clutch mechanism showing the solenoids which control the reversing apparatus in the electrical motor and the clutch. In this position, the apparatus is in a neutral position;

Fig. 3 is a fragmentary detail cross-section taken on the line 3—3 of Fig. 2 showing the connection between the clutch operating lever and the motor solenoid lever;

Fig. 4 is a fragmentary cross-section taken on line 4—4 of Fig. 2 showing the connection between the clutch operating lever and ventilator control solenoid;

Figure 5:
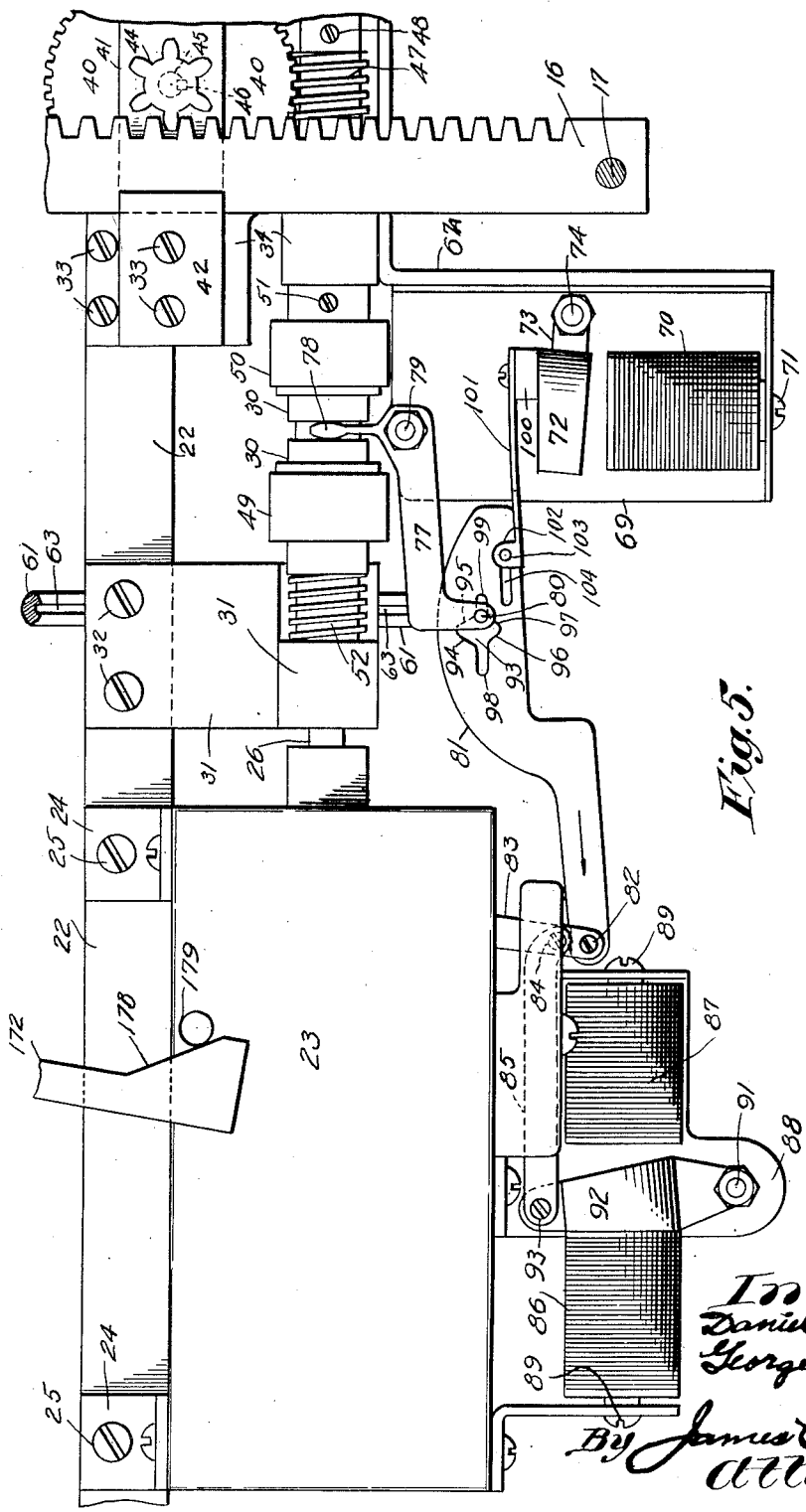
Fig. 5 is another fragmentary elevation of the electrical motor and clutch mechanism similar to Fig. 2 but in which the left-hand motor solenoid has been energized. In this position, the right-hand side of the clutch is engaged to drive the worm and worm gear which raises or lowers the window-pane, as the case may be.
Figure 6:
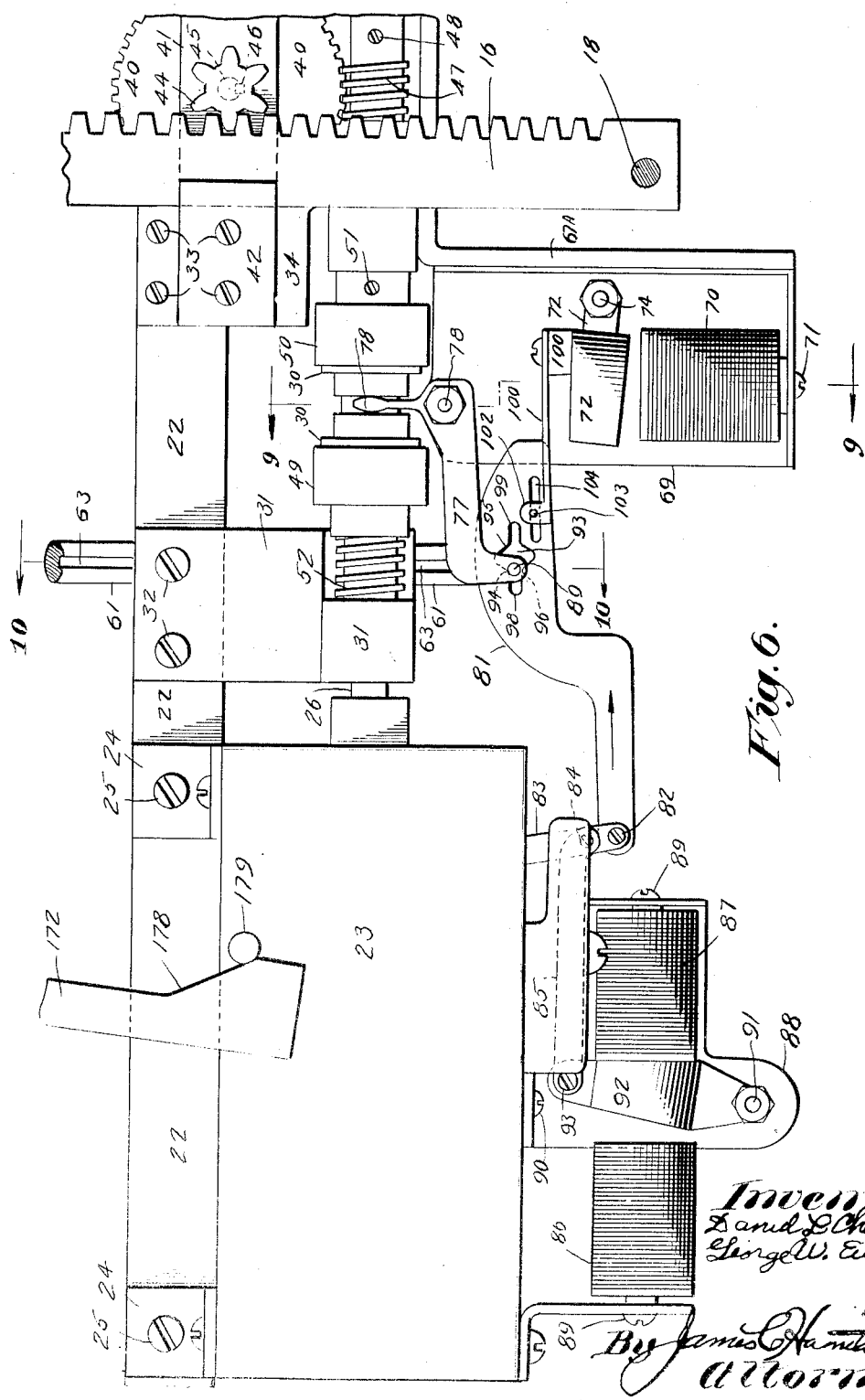
Fig. 6 is another enlarged fragmentary elevation similar to Fig. 2 but in which the right-hand motor solenoid has been energized. In this position, the left-hand side of the clutch has been engaged to drive the lef-hand worm which operates the window ventilator, this figure being the reverse position from that shown in Fig. 5.
Figure 7:
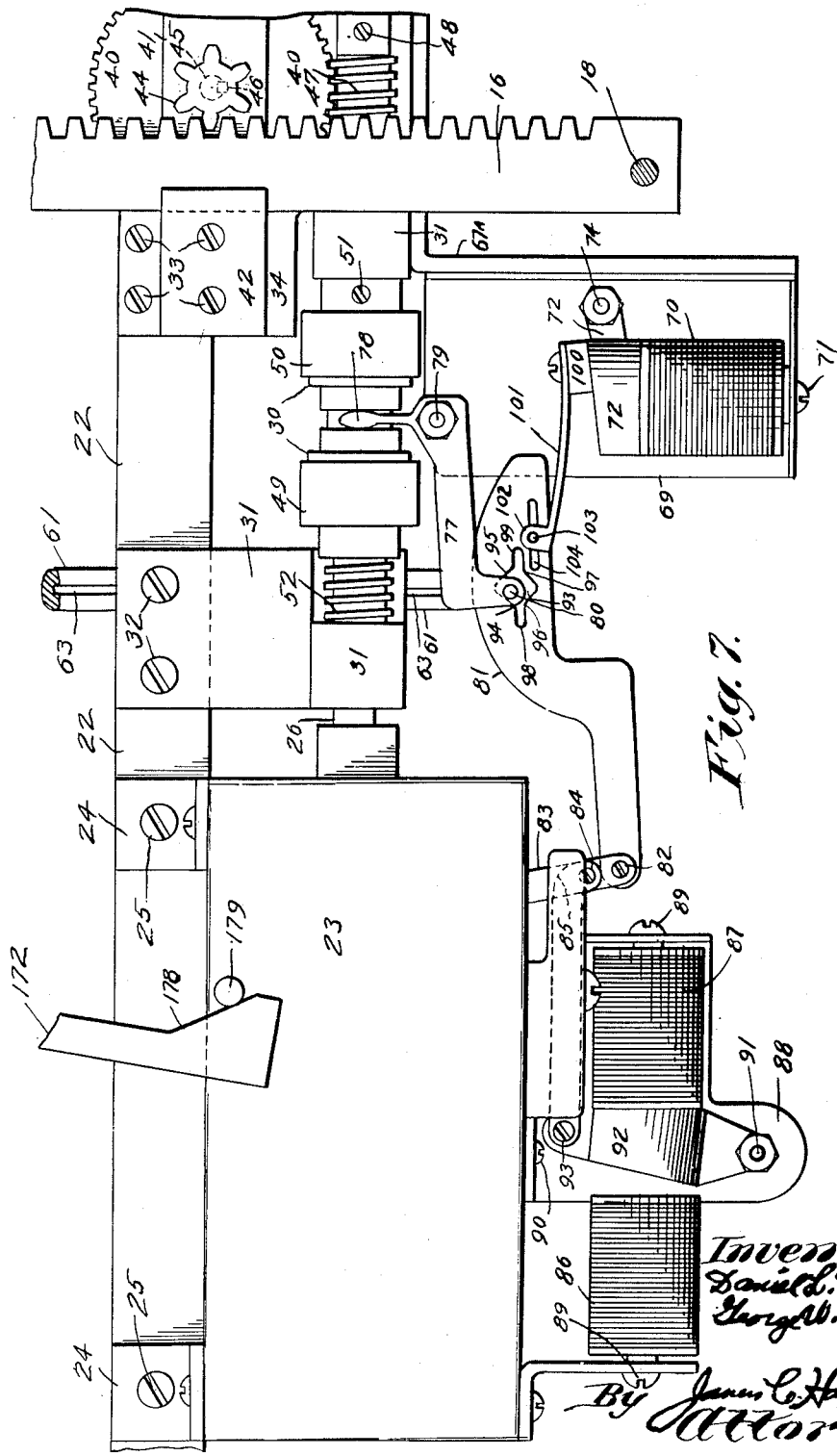
Figure 22:
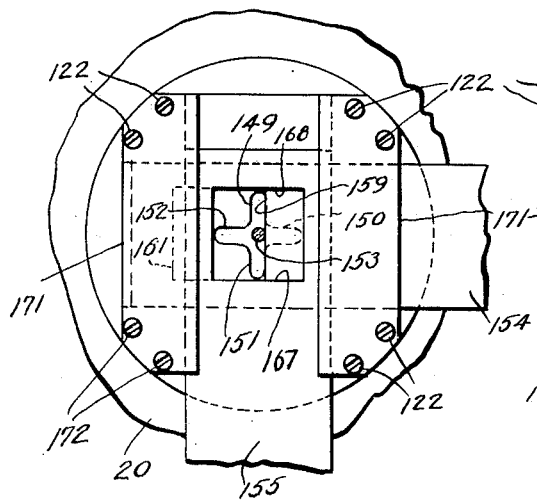
Figure 23:
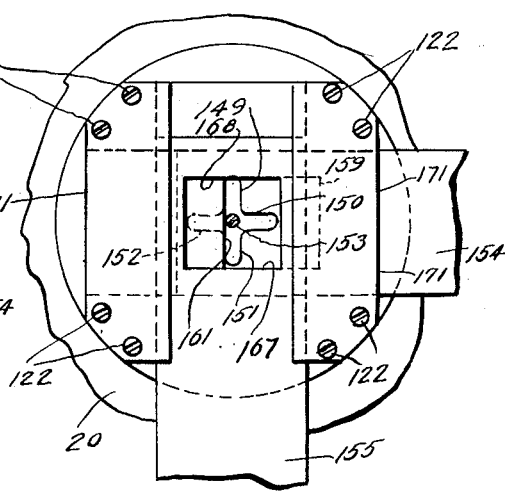
Figure 24:
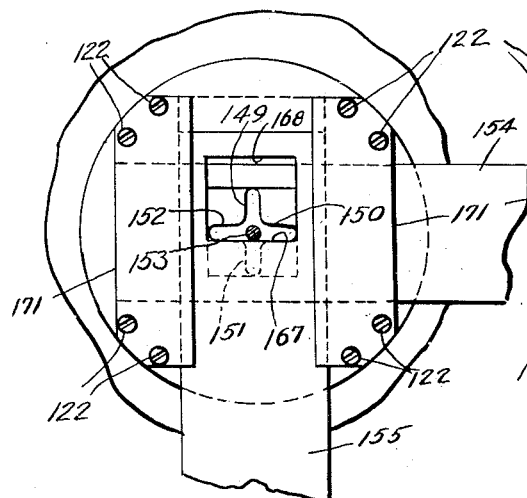
Figure 25:
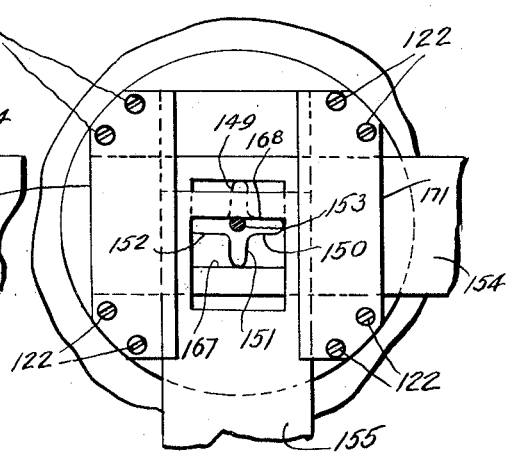
Figure 33:
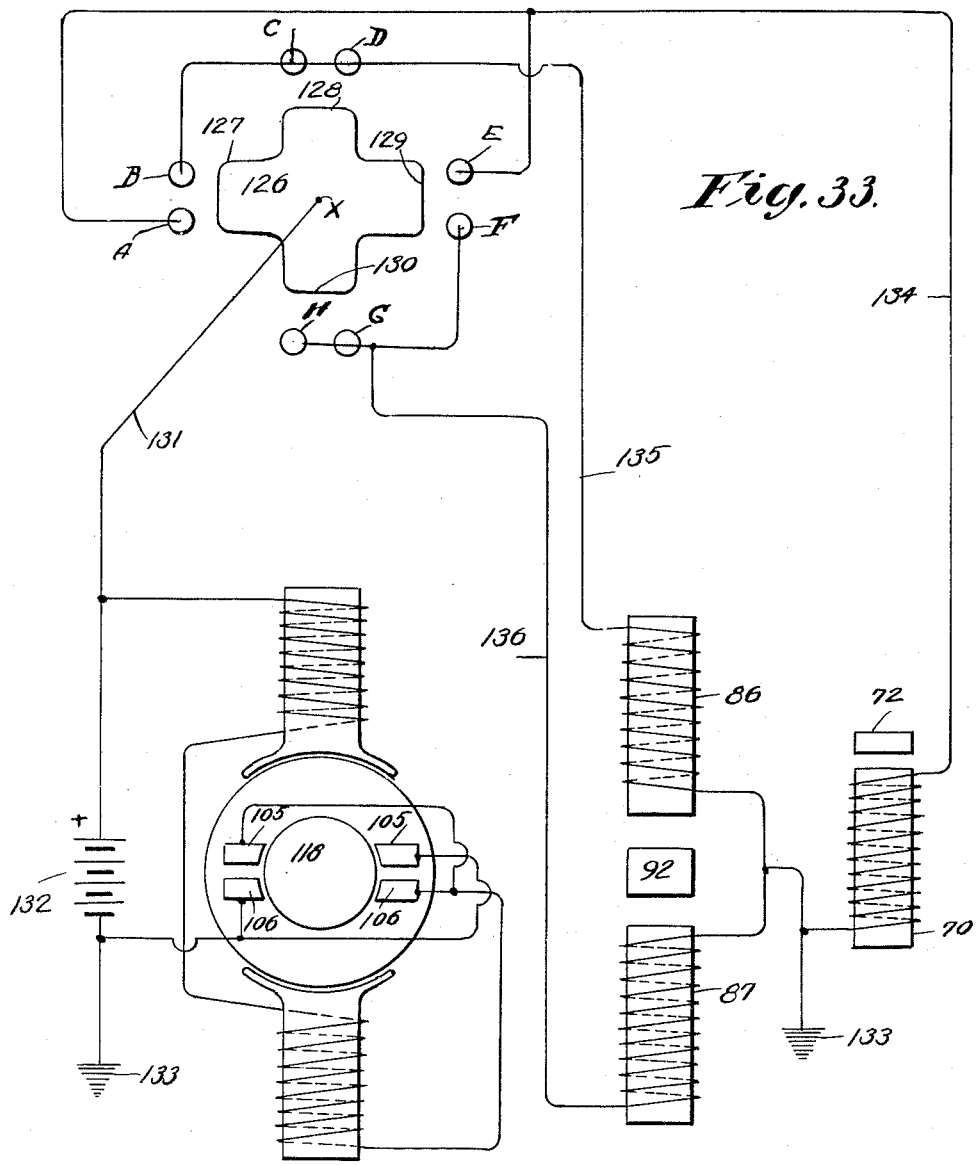

Fig. 7 is another enlarged fragmentary elevation similar to Fig. 6 except that the right-hand solenoid below the clutch has been energized, this being the window ventilator control solenoid. In this position, the left-hand portion of the clutch is engaged to drive the left-hand worm. In this illustration, it will be observed that although the right-hand motor solenoid is energized, as in Fig. 6, yet the clutch has been reversed from the position shown in Fig. 6;

Fig. 8 is still another enlarged and fragmentary elevation of the apparatus similar to Fig. 5. In this illustration, it will be observed that the right-hand window ventilator control solenoid is still energized, as in Fig. 7, with the left-hand motor solenoid in the position shown in Fig. 5. In this position, the clutch has still been maintained in engagement with the left-hand worm which operates the window ventilator in a reverse direction from that shown in Fig. 7;

Fig. 9 is a fragmentary cross-section taken on the line 9—9 of Fig. 6 showing the connection of the clutch operating lever with the clutch central sliding portion;

Fig. 10 is a fragmentary rear elevation of the supporting plate carrying the ventilator control solenoid, and showing the spring member which normally holds the electrically magnetized portion of the solenoid unit in an expanded position when the solenoid is de-energized, as for instance, in Fig. 6;

Fig. 11 is a fragmentary cross-section having the central portion broken out and being taken on the line 11—11 of Fig. 1, the scale being exaggerated. In this illustration, the connection between the ventilator and the left-hand worm shown in Figs. 2, 5, 6, 7 and 8 is shown;

Fig. 12 is a plan fragmentary cross-section taken on the line 12—12 of Fig. 11 showing a link mechanism which operates the electrical switch control to the ventilator described more in detail further along in the specification;

Fig. 13 is an enlarged typical vertical fragmentary cross-section taken through the clutch and worm and a portion of the clutch operating lever, other portions of the apparatus being shown in elevation;

Fig. 13A is a cross-section taken on the line 13A—13A of Fig. 13 and showing the construction of the interior of the clutch discs and their relation to the main motor shaft;

Fig. 14 is an enlarged fragmentary elevation, portions of which are broken away for convenience, and showing the switch mounted on the inside door panel together with a link mechanism which is located on the lower portion of the door panel adjacent the indicated motor case when the window pane is in a lowermost position. Also the electrical switch is shown connected to the link member shown in Fig. 12;

Fig. 15 is also an enlarged fragmentary elevation, portions of which have been broken away and showing the relative positions of the link members shown in Fig. 14 when the motor case is in a high position, as when the window is raised;

Fig. 16 is a fragmentary cross-section and elevation taken on the line 16—16 of Fig. 14 showing the construction of the electrical switch which is mounted in the inner door panel and the connection with the ventilator link shown in Fig. 12;

Fig. 17 is another fragmentary cross-section and elevation similar to Fig. 16 but showing the electrical switch in one of its four contact positions;

Fig. 18 is another partial cross-section and elevation taken on the lines 18—18 of Fig. 16 showing the four contact arms of the spring contact member of the electrical switch;

Fig. 19 is another partial cross-section and elevation of the electrical switch being taken on the line 19—19 of Fig. 16, and showing the upper portion of the switch assembly;

Fig. 20 is a fragmentary elevation of the electrical switch mechanism which connects with the ventilator link member shown in Fig. 12;

Fig. 21 is a fragmentary elevation of the electrical switch mechanism which connects with the link mechanism shown in Fig. 14;

Fig. 22 is a fragmentary elevation of the switch mechanism shown in Fig. 14 but showing the switch lever having been pushed into a neutral position by the member shown in Fig. 20;

Fig. 23 is a fragmentary elevation of the switch mechanism shown in Fig. 22 but showing the switch lever having been pushed from the position shown in Fig. 17 back into a neutral position by the member shown in Fig. 20;

Fig. 24 is a fragmentary elevation of the switch mechanism shown in Fig. 22 but showing the switch lever having been returned to a neutral position from a lower position by the member shown in Fig. 21;

Fig. 25 is another fragmentary elevation of the switch mechanism shown in Fig. 22 but showing the switch lever having been returned to a neutral position from its high position by the member shown in Fig. 21;

Fig. 26 is a fragmentary side elevation and cross-section of the electrical motor, a portion of the motor case being broken away to show one side of the motor commutator and a central commutator brush cam lever. In this position, the brush mechanism of the electrical motor is shown in a neutral position. This corresponds to the position assumed when the motor solenoids are in the position shown in Fig. 2;

Fig. 27 is a fragmentary side elevation and cross-section of the electrical motor similar to Fig. 26 but showing the commutator brush cam lever in the position assumed when the motor solenoids are in the position shown in Figs. 6 and 7;

Fig. 28 is a fragmentary side elevation and cross-section of the electrical motor similar to Fig. 26, but showing the commutator brush cam lever in the position assumed when the motor solenoids are in the position shown in Figs. 5 and 8;

Fig. 29 is a partial cross-section and elevation taken on the line 29—29 of Fig. 26. In this position, it will be noted that the commutator brushes are out of contact with the commutator which is indicated in dot-and-dash lines;

Fig. 30 is another partial cross-section and elevation taken on the line 30—30 of Fig. 27. In this position, it will be noted that one pair of the brushes is in contact with the commutator while the other pair of brushes is held away from the commutator;

Fig. 31 is another partial cross-section and elevation taken on the line 31—31 of Fig 28. In this position, it will be noted that the brushes shown in contact with the commutator in Fig. 30 are now moved out of contact;

Fig. 32 is an expanded view of the commutator brush cam and lever;

Fig. 33 is a wiring diagram.

Referring more in detail to the drawings, like parts bearing like numerals, 10 indicates a portion of an automobile door. This door is of a more-or-less standard shape and design having a window-sill 11 and a divided window. The vertical sliding windowpane 12 may be slid up and down in slideways, one of which 13 is located in the mid-portion of the door and shown in Fig. 1 of the drawings. Pivoted in the upper portion of the automobile door 10 is the swinging door window ventilator pane 14, the lower edge of which is pivoted on the window-sill 11. Fixed rack members 16 and 17 are attached by means of bolts 18 and 19 respectively to the inner automobile door panel 20, all but a small portion of which has been broken away, as viewed in Fig. 1.

Attached to the lower frame 21 of the window pane 12 is the mechanism which raises and lowers the window 12 and swings the ventilator pane 14. This apparatus moves up and down with the window pane 12 in a more or less floating condition. A horizontal bar 22 is attached to the window frame 21, as shown in Fig. 1, and extends to the left-hand side of the door. Mounted on this horizontal bar 22 at the extreme left-hand end is a reversible motor which is inclosed in a motor case 23, the case 23 of which is attached to said horizontal bar by means of the angle irons 24 and screws 25. An electrical motor shaft 26 drives the mechanism, but said shaft 26 is independent of the shaft shown at 27. For a more detailed description of the drive mechanism an inspection of Fig. 13 will disclose that the motor shaft 26 is provided with a key member 28 which engages in a keyway 29 provided in the central portion 30 of a clutch member. The central portion of the clutch indicated at 30 is horizontally slidable on the shaft 26. The motor end of the shaft 26 is journalled in a bearing member 31 which is attached by means of the screws 32 to the horizontal bar 22 which is suspended from the window frame 21, as shown in Fig. 1. Another shaft bearing 33 is also provided on the right-hand side of the clutch being a part of the bracket 34 which is carried by the horizontal bar 22 being attached thereto by means of the screws 34. The left-hand end of a second shaft 27 is journalled in the bearing member 33. Also attached to the horizontal portion of the window frame 21 is another bracket 35 being held to said horizontal member by means of the screws 36, as shown in Fig. 1. The bracket 34 is provided with two bearings 37 through which is journalled the right-hand end of the shaft 27. The left-hand end of the shaft 27 is recessed at 38 to receive the shouldered pilot end 39 of the right-hand end of the motor shaft 26, as shown in Fig. 13.

Journalled in the bracket 35 is a worm gear 40. A horizontal strap member 41 spacing plate not shown, and a front plate 42 is mounted on the bracket 34 by means of the screws 43. A pinion 44 and pinion shaft 45 is provided, the pinion 44 being mounted flush against the strap 41, the shaft 45 of which is integral with the said pinion and passes through the said strap 41, worm gear 40 and bracket 34, a key member 46 connecting the worm gear 40 with the pinion shaft 45 such that when the worm gear 40 is turned, the pinion 44 also turns. Suitable means is provided on the back side of the bracket 34 to prevent the pinion 44 from moving endwise.

Between the bearings 37 attached to the bracket 34 and located on the shaft 27 is a worm 47 which is engaged with the teeth of the worm gear 40. The worm 47 is fixed to the shaft 27 by means of a set screw 48 such that when the shaft 27 revolves the worm 47 also revolves, turning the worm gear 40 and pinion 44.

As previously stated the rack member 16 is fixed to the inner door panel 20, the back side of which is engaged against the front side of the strap member 41, the plate member 42 maintaining said rack 17 against the strap member 41. It will be noted that the teeth of the pinion 44 are engaged with the teeth of the rack such that when the shaft 27 is rotated the entire bracket together with the worm gear 40 and pinion 44 will move up or down, as the case may be, and as the bracket is attached to the window frame 22, the window is likewise raised or lowered. In the drawings, we have shown two sets of brackets, worm gear, and pinion assemblies engaging with the two fixed racks 16 and 17. These assemblies are identical; therefore, the description of one will suffice for both. If desired, and found practicable, one of the assemblies may be dispensed with.

The clutch assembly is composed of the previously mentioned central portion 30 which is movable endwise on the shaft 26, and housing members 49 and 50. By an inspection of Fig. 13 it will be noted that the housing 50 is fixed to the shaft 27 by means of the set screw 51 such that when the housing 50 rotates the shaft 27, worm 47, worm gear 40, and pinion 44 also rotate, thereby moving the window up or down, as the case may be.

The left-hand end of the central clutch member 30 is journalled in the housing 49 which for convenience is shown to be integral with a worm 52, but no set screw is provided between the worm 52 and the motor shaft 26 so that the shaft may rotate freely under certain conditions in the worm and housing 52 and 49 respectively.

The clutch is of the friction type such that when the motor shaft 26 is rotating either the housing 49 and worm 52 may be caused to rotate with it depending in which direction the central clutch member 30 is moved. This result is obtained by means of discs of different character arranged on the shaft in alternate relation.

Fig. 13A shows the relationship of these discs with respect to the shaft 26 and the housing 49. It will be noted that the housings 49 and 50 are provided with slots located on opposite sides. A series of discs 54 are provided having annular edges which are rotatable inside of the housings 49 and 50 but are provided with a shaft opening 55 one side of which is flat, as at 56. A flatted area 57A is provided on the shaft 26 which engages the flat side 56 of the discs 54. It is therefore apparent that when the motor shaft 26 is rotated these discs 54 will also rotate inside of the housings 49 and 50. Alternately spaced with respect to the discs 54 is a second series of discs 57 which are provided with projections 58. These projections 58 extend into the slots 53 in the housings 49 and 50. These discs 57 are provided with central openings which are journalled around the shaft 26, the shaft rotating freely therein.

It will therefore be seen that when the central clutch portion 30 is pressed to the left-hand side on the shaft 26 the shaft driven discs 54 become compacted against the housing held discs 57, the result of which is to cause the housing 49 to rotate together with the worm 52. The worm 52 operates the ventilator 14 of the automobile window, as will be described further along in the specification.

In a similar manner, when the central clutch member 30 is pressed to the right-hand side on the shaft 26, the discs 54 become compacted against the discs 57 held in the housing 50 thereby causing the housing 50 to rotate. Due to the fact that the housing 50 is screwed to the independent shaft 27, it is therefore apparent that the pinions 44 will be caused to rotate against the racks 16 and 17 thereby causing the window pane 12 to move either upwardly or downwardly as the case may be. It should be borne in mind that the end movement of the central clutch member 30 is very slight. The clearance between the ends of the central clutch member 30, the discs 54 and 57, and the inside back faces of the housing members 49 and 50 are in the nature of a running fit, and such friction surfaces are oiled to prevent excessive wear, and the movement of the member 30 is more in the nature of pressure exerted against the discs for the purpose of increasing the friction to the point where the housings begin to rotate.

As previously stated the electrical motor located in the motor casing 23 is of the reversible type such that the motor shaft 26 may be reversed in its direction of rotation at the will of the operator by means of an electrical switch. This electrical switch and motor control will be fully described further along in the specification. For the present it will be assumed that the electrical motor is reversible; therefore it is apparent that the worm which by means of the clutch member 30 may be caused to rotate in a reversible direction when the shaft 26 is caused to rotate. On the other hand, it will also be apparent that the said worm 52 will not rotate but remain stationary, even though the shaft 26 rotates if the central clutch member 30 is in a neutral position or is being forced toward the housing 50.

In a similar manner it will be apparent that when the pressure is applied to the clutch member 30 in a left-hand direction, the discs 54 and 57 will not cause the housing 50 to rotate, and the drive shaft 27 therefore does not turn but, if the pressure on the central clutch member 30 is in a right-hand direction the discs cause the housing to rotate the shaft 27 in a reversible manner according to the direction of rotation of the reversible motor. It will therefore be apparent that when the worm 47 is rotating in either direction there can be no movement of the worm 52, and likewise when the worm 52 is rotating in either direction, there can be no movement of the worm 47.

The operation of the various parts connected with the worm 47 having been thoroughly described, we shall now describe the connections between the worm 52 and the window ventilator 14.

Referring now to Fig. 11 of the drawings accompanying the application, it will be seen that the worm 52 on the shaft 26 is directly engaged with a worm gear 59 which is mounted in a back bearing 60 attached to the bearing bracket assembly 31 which is suspended from the horizontal bar member 22. A ventilator shaft member 61 is journalled through the bearing portion 60 and worm gear 59, the upper end of which is journalled in the door bearing member 62. This ventilator shaft 61 is also provided with a long keyway or key slot 63 which extends all the way from the lower end of the shaft to just below the door shaft bearing 62. The worm gear 59 is provided with a suitable key which engages in the shaft slot 63 such that bearing 60 together with the worm gear 59 may slide up and down on the shaft 61, as the window 12 is raised or lowered together with the electrical motor and driving mechanism, but at any point of vertical travel on the shaft 61, the said shaft may be caused to rotate by means of the worm 52 and worm gear 59. On the upper end of the shaft 61 above the bearing 62 we have provided a pinion member 64 which is fixed to the said shaft such that it turns when the shaft turns in either direction.

The ventilator pane 14 is mounted in a conventional frame 65 to which is fixed a vertical stub shaft 66 the bearing of which is fixed in the window-sill area of the door, the window-sill being indicated at 11. On the lower end of the stub shaft 66 we have provided a ventilator gear 67 which is engaged with the pinion member 64 driven by the shaft 61. It will therefore be seen that when the worm 52, gear 59, shaft 61, pinion 64 and gear 67 are caused to rotate, the window ventilator pane 14 will swing to the right-hand or to the left-hand side, either opening or closing the ventilator as the case may be. In other words, when the reversible motor located in the motor case 23 operates in either direction, the ventilator 14 does likewise, if the central clutch member 30 is pressed to the left-hand side on the shaft 26, but no action occurs at the ventilator 14 when the clutch member 30 is pressed to the right-hand side or it is in a neutral position.

The next step in the description of our apparatus will be confined to the mechanical operation of the central clutch member 30. This action is better illustrated in Figs. 1 to 10 inclusive.

Attached to the bearing 33 by means of the screw 68 is an angle member 67A, the vertical portion of which supports an attached plate to which is fixed the ventilator control solenoid 70, the same being attached to the bottom portion of the plate 69 by means of the screw 71. Also pivoted to the plate 69 is a magnetic member 72 located directly above the solenoid 70 such that when the solenoid 70 is electrically energized the member 72 is pulled down against the top of the solenoid, as in Figs. 7 and 8. The magnetic member 72 is pivoted to the shaft 74 which passes through the plate 69 to the back side, as shown in Fig. 10. The back end of the shaft 74 is provided with a shoulder 75 through which passes the end of a spring member 76; the other end of the spring member 76 is anchored to the screw 77. The spring member 76 normally maintains the magnetic member 72 in a raised position, as shown in Fig. 2 at all times except when the solenoid 70 is electrically energized, at which time the resistance of the spring 66 is overcome.

On the upper face of the plate 69 is pivoted the clutch operating lever 77. This lever is provided with a yoke portion 78, better shown in Fig. 9, the curved portion of which engages around the groove 79 of the central clutch portion 30. The yoke portion 78 of the lever 77 is pivoted on the pin 79 mounted on the plate 69 such that the lever 77 is able to press the central clutch portion 30 toward the housings 49 or 50 by merely pressing up or down on the lever 77.

In Fig. 2 the apparatus is shown in a neutral position with no pressure being applied to the central clutch member 30 in either direction.

The lower end of the clutch operating lever 77 is provided with a pin 80, also shown in Fig. 3. The pin 80 engages in an opening provided in another lever 81 the left-hand end of which is pivoted at 82 to a vertical electrical motor brush control lever 83 projecting from the interior of the electrical motor casing 23. The action of this pivoted brush lever 83 will be discussed further along in the specification in connection with the electrical brush control of the motor. Also pivoted at 84 to the brush lever 83 is another lever 85 which is operated from the solenoids. The solenoids 86 and 87 are attached to a solenoid frame 88 by means of the screws 89, the frame 88 being attached to the motor casing 23 by screws, as at 90. Pivoted at 91 on the frame 88 is another magnetic member 91 the upper end of which is pivoted at 93 to the solenoid lever 85. It will be seen that when the solenoid 87 is energized the member 92 will move to the right-hand side against the solenoid 87 thereby pushing the levers 85, 83 and 81 to the right, and when the solenoid 86 is energized the reverse movement takes place. Fig. 5 shows the solenoid 86 in action and the levers 85, 83 and 81 moved to the left-hand side. Fig. 6 shows the reverse action with these levers thrown to the right-hand side.

Referring more particularly to Fig. 5 we have shown the apparatus as it appears when the window pane 12 is being raised. In this position, the solenoid 86 has been energized and the levers 85, 83 and 81 have been moved to the left-hand side. An inspection of the right-hand end of the lever 81 will disclose that the diamond shaped opening 93 is provided with four cam surfaces 94, 95, 96 and 97 and horizontally disposed elongated slots 98 and 99. Attached to the magnetic member 72 is an insulated member 100 to which is fixed a leaf spring 101, the front end of which is provided with upstanding members 102 through which is located a pin 103. The pin 103 also passes through an elongated slot 104 located in the lever 81. When the apparatus is in the position shown in Fig. 5 the ventilator control solenoid 70 is not functioning unless it is desired to operate the ventilator, which is not the case at the present point of the description. In the position shown in Fig. 5 the spring 101 tends to press the lever 81 upwardly such that the pin 80 is engaged on the side of the opening 93 adjacent the cam surfaces 96 and 97, and as the lever 81 is drawn to the left-hand side the pin 80 is pressed upwardly by the cam surface 97, as shown in Fig. 5.

With the apparatus in the position shown in Fig. 5, the clutch operating lever 77 is pressed upwardly, causing the central clutch member 30 to be thrust to the right-hand side. In this position, the shaft 27 rotates causing the window pane 12 either to rise or drop depending on which way the motor is turning. Now, if the electrical motor is reversed, the solenoid 97 is energized causing the levers 85, 83 and 81 to be moved to the right-hand side. The reversing of the motor is caused, as will be more fully described farther along in the specification, by the action of the solenoids in throwing the lever 83 to the right-hand or left-hand side. In the position shown in Fig. 6, the solenoid 70 which is in the electrical circuit connected with the ventilator, is still de-energized as in Fig. 5 because the operator is only concerned with raising or lowering the window pane 12. In this position shown in Fig. 6, it will be seen that the lever 81 has moved to the right-hand side, and the clutch operating lever pin 80 is now engaged with the cam surface 96; therefore the central clutch member 30 is still pressed over to the right-hand side, and the housing member 50 is still driving the shaft 27 but in a reverse direction because of the reversing of the motor.

Now we shall assume that it is desired to operate the ventilator and not the main window pane 12. An inspection of Fig. 7 will disclose that the solenoid 87 is still in the same position as shown in Fig. 6 with the levers 85, 83 and 81 in the right-hand position, but the ventilator control solenoid 70 is now energized, and the magnetic member 72 is depressed thereby placing a reverse tension of the spring 101 and pulling the lever 81 downwardly. In this position, the pin 80 is brought into contact with the cam surface 94, as shown in Fig. 7, and the clutch operating lever 77 is depressed causing a thrust to the left-hand side on the clutch member 30 thereby engaging the housing 49 and causing the worm 52 to rotate the shaft 61 connecting the ventilator 14. Now we shall assume that it is desired to reverse the movement of the ventilator 14. The ventilator control solenoid 70 is still energized causing the lever 81 to be pulled down, as in the case of Fig. 7, but the solenoid 86 is now in the electrical circuit in place of solenoid 87 and the levers 85, 83 and 81 are thrown to the left-hand side, as in Fig. 8. The operating lever pin 80 is now in engagement with the cam surface 95 in the opening 93 of the lever 81, and the lever 77 is still depressed and the central clutch member 30 engaged with the housing 49, but due to the fact that the lever 83 has been reversed from the position shown in Fig. 7, the electrical motor has been reversed; therefore the ventilator 14 is reversed in its direction of movement.

As previously stated the moving of the lever 83 from the left-hand side to the right-hand side reverses the electrical motor. This is better illustrated in Figs. 26 to 32 inclusive. In Figs. 26 and 29, the apparatus is shown in a neutral position. It will be noted that we have made use of two sets of electrical brushes, one set being indicated at 105 and the other set at 106. The brush lever 83 is pivoted at 107 on a pin 108 mounted in brackets formed from the bottom of the motor casing 23, as indicated at 109. On the upper end of the lever 83 is located an insulated member 110, which is slotted to receive the upper end of the lever 83 to which it is pinned. The brushes 105 and 106 are composed of carbon and are mounted in spring levers 111 and 112 respectively. These brush levers 111 and 112 are insulated from the motor case 23, being mounted on insulation blocks 113 and having outside insulation members 114 through which the bolts 115 pass and to which the electrical wires attach.

Extending inwardly toward each other are brush lever extension members 116 and 117, which normally bear against the upper surface of the insulated member 110 so that the brushes 105 and 106 are both out of contact with the commutator 118 when the brush lever 83 is in a vertical or neutral position, as shown in Fig. 26.

When the solenoid 87 is energized the lever 83 is swung to the right-hand side, as indicated in Fig. 27 thereby releasing the pressure against the brush levers 111 and permitting the brushes 106 to contact the commutator 118, as shown in Fig. 30, and at the same time expanding the brushes 106 farther away from the commutator 118. In this position the electrical motor revolves in one direction, and when the brush lever 83 is swung to the left-hand side, as shown in Fig. 28, the reverse takes place, bringing into contact with the commutator 118 the brushes 105, thereby causing the electrical motor to reverse its direction of rotation.

Figs. 14 to 21 inclusive illustrate the electrical switch mechanism controlling the electrical motor and solenoids illustrated in the accompanying drawings.

Referring more in detail to Figs. 16 to 19, 119 indicates the switch housing which is composed of a cylindrical body member 120 having a flanged front side 121 which is attached to the inner door panel 20 by means of the screws 122. On the back on the switch body portion 120 is attached by means of the lugs 123 and screws 124, an insulated contact member 125. This insulated contact member or block 125 is provided with a series of double contacts A, B, C, D, E, F, G and H. A central contact X is connected to a metal spring contact member 126 which is provided with four arms 127, 128, 129 and 130 all of which are normally out of contact with the contacts A to H inclusive when the switch is in an open circuited position, as in Fig. 16. Two of the contacts D and H are for convenience and not essential, as will be noted by an inspection of the wiring diagram in Fig. 33, contact D being shorted to contact C, and contact H being shorted to contact G. The central contact X is directly connected through the wire 131 to the positive battery terminal 132, the negative terminal of the battery 132 being grounded on the metal body of the automobile and simply shown as a ground at 133 in the wiring diagram. The contact A is connected by the wire 134 to the ground 133 after passing through the coil around the core of the ventilator control solenoid 70. Contacts B, C, and D are connected to the wire 135 and to the ground 133 after passing through the coil around the core of the solenoid 86. Contact E is directly connected to the wire 134 which leads to the solenoid 70. Contacts F, G and H are connected by means of the wire 136 with the ground 133 through the solenoid 87. By an inspection of Fig. 33 it will be seen that when the metal spring member 126 is depressed so that the portion 130 engages the contacts G and H, the solenoid 87 is energized, which causes the magnetic member 92 to engage with the core of the solenoid, thereby throwing the levers 85, 83 and 81 to a left-hand position as shown in Fig. 6. When this action takes place the commutator brushes 105 are brought in contact with the commutator 118 which completes a circuit of electricity from the battery 132 through the field coils of the motor and to the ground 133. This is the action which takes place when the window 12 is raised or lowered, as the case may be. If the portion 128 of the spring contact member 126 be contacted with the contacts C and D, the solenoid 86 is energized and the magnetic member 92 is drawn against the core of the solenoid 86, thereby causing the brush lever to be swung to the right-hand side, as in Fig. 6, thereby releasing the brushes 105 from the commutator 118 and bringing the brushes 106 into contact, thereby reversing the direction of rotation of the electrical motor. These two positions of the electrical switch represent the movement of the main automobile window pane 12 up or down as the case may be.

Now, if it is desired to operate the automobile window ventilator 14, the portion 127 of the contact member 126 is brought into contact with the contacts A and B. In this position, the solenoid 86 and the solenoid 70 are both energized and the levers 85, 83 and 81 are moved in a reverse direction causing the drive shaft 26 to drive the worm 52 and thereby swing the ventilator 14 to the right or left-hand side, as the case may be. If it is desired to reverse the movement of the ventilator member 14, the portion 129 of the contact member 126 is contacted with the contacts E and F; this position energizes the solenoid 87 and also the solenoid 70, and the brushes 105 and 106 are reversed, thereby energizing the electrical motor in a reverse direction.

Attached to the spring contact member 126 is an insulated cone-shaped member 137, the top of which is provided with a recess 138. Secured in the cone recess is a coil spring member 139, the other end of which is secured to a four armed spider member 140. This spider member 140 has four arms 141, 142, 143 and 144 to which are respectively attached the spider arm insulated members 145, 146, 147 and 148. In the front flanged side 121 of the electrical switch casing 119 it will be noted that we have provided four slots 149, 150, 151 and 152. A finger switch lever member 153 is attached to the spider member 140 and may be pushed into any one of the four slots 149 to 152 inclusive. When the finger lever 153 is so operated the spring member 139 allows the spider to be depressed, and one of the spider arm insulated members depresses one of the spring contact portions 127, 128, 129 or 130, as the case may be, thereby making contact with the contact member A, B, C, D, E, F or G or combinations of the same as previously described.

To prevent the spider from remaining in either of the several contact positions after the ventilator 14 or window pane 12 have reached their limit of travel, we have provided a means for opening the electrical switch circuit which makes use of two slide members. One of these slide members 154 is indicated in Fig. 20 and is associated with the ventilator 14, the other of which indicated at 155 in Fig. 21 is associated with the window pane 12.

It will be noted that these slide members 154 and 155 are provided with square openings 156 and 157 respectively. The slide 154 which is operated by the ventilator mechanism is provided with four sides 158, 159, 160 and 161. Referring back to Fig. 12 of the drawings, it will be noted that the gear 67 which is directly attached to the ventilator shaft 66 is provided with a pin 162 which connects with a link member 163, the various positions of which are shown in dot-and-dash lines. This link member 163 is connected to the slide member 154 by means of the projection 164 which is inserted through the slot 165 located in the slide member 154, a pin 166 being provided to maintain the link member 163 in place. It will thus be seen that when the gear 67 which is attached to the ventilator member 14 is rotated in the right or left-hand direction, the slide 154 will be moved to the right or left, as the case may be.

In Fig. 22 the slide 154 has been moved from right to left, and the switch finger lever 153 which had previously been over in the slot 150 has been pushed back to the central or neutral position by contact with the side 159 of the square opening 156 in the slide 154. In Fig. 23 the reverse has taken place and the lever 153 has been returned from the slot 152 to a central or neutral position. Due to the elongated slot 165 in the slide 154, the slide 154 does not move except when the window ventilator member is at or has nearly reached its limit of movement in each direction. At the same time it should be observed that at no time or position is the finger lever 153 prevented from being moved into the up or down position in the slots 149 and 151 in the switch flanged portion 121, thereby making it possible for the window pane 12 to be raised or lowered as the choice might be.

In a similar manner we have provided a slide member 155 previously referred to, to control the finger lever 153 when operating in the slots 149 and 151. Fig. 24 shows the slide 155 having withdrawn the finger lever 153 from the slot 151 by contact with the side 167. In Fig. 25 we have shown the finger lever 153 having been withdrawn from the slot 149 by means of contact with the side 168 in the opening 157 of the slide 155. In a similar manner the sides 169 and 170 of the slide 155 do not interfere with the finger lever 153 from engaging in the slots 150 and 152.

The slide members 154 and 155 are arranged in slide ways provided under the strips 171 attached to the flanged face of the switch body by means of the screws 122.

The slide member 155 is controlled by means of a series of links and levers which are operated by a kicker lever 172 which is pivoted at 173 to a bracket 174 attached to the frame of the automobile door 10. On the inner panel 20 of the automobile door 10 is a bell-crank lever 175 pivoted at 176. The upper arm 177 of the lever 175 is provided with a skid member 178 which is engaged with a pin 179, located on the side of the electrical motor casing 23 such that when the motor casing reaches a high point, as in Fig. 15 the lever 175 is pivoted to the left-hand side. A left-hand arm 180 of the lever 175 is provided with an elongated slot 181 through which is engaged a screw pin 182 fixed in the lower end of the slide member 155. It will thus be seen that when the lever 175 is pivoted to the right or left-hand side the slide member 155 is moved up or down as the case may be. The kicker lever 172 is also provided with a bell-crank arm 182 which is pivoted at 183 to a link member 184. This link member 184 preferably passes up on the inside of the inner door panel 20, and the upper end is pivoted at 185 to the arm 180 of the bell-crank lever 175, a slot 186 being provided in the inner door panel 20 to allow the pivot member 185 to operate.

When the motor casing reaches the lowermost position corresponding to that position of the window pane shown in Fig. 1 and in Fig. 17, the motor case pin 179 will engage the angle side 187 of the kicker lever 172 and pivot same on the pivot 173, thereby raising up the link member 184. This action in turn raises the slide member 155 up to the position shown in Fig. 24. At the same time the bell-crank lever 175 is returned to the position shown in Fig. 14, so that it is in position to be acted upon by the motor casing pin 179 when the motor casing 23 reaches a high position, as shown in Fig. 15, at which time the bell-crank lever 175 draws the slide member 155 downwardly into the positions shown in Figs. 15 and 25.

It will thus be seen that the finger lever 153 will be returned to a central position as shown in Figs. 14, 22, 23, 24 and 25 whenever the window pane 12 reaches its limit of travel or the window ventilator member 14 has been swung all the way in either direction.

Having thus described the details of the construction of our invention, we shall now describe the assembled apparatus in actual operation.

In operation, as previously set forth, the main automobile window pane 12 is caused to rise and descend and the window ventilator 14 to swing open or closed, by the manipulation of one electrical switch finger lever, as indicated at 153.

If we assume that the window pane 12 is in a lowermost position and the ventilator 14 is in a closed position, as shown in Fig. 1, and we first wish to close the window pane 12, the finger lever 153 is pushed upwardly in the slot 149 which causes the spider member 140 to pivot on the spring 139 in the same direction. If the lever 153 is tilted far enough, the insulated member 145 on the spider bears against the spring contact arm 128 of the contact member 126, bringing the arm portion 129 into contact with contacts C and D located in the insulating block 125 on the back of the switch. As will be seen from an inspection of the wiring circuit in Fig. 33, the positive side of the battery 132 is directly connected with the spring contact member 126; therefore an electrical current passes from the positive terminal of the said battery through the contacts C and D, conductor 135, through the solenoid 86 to the ground 133. The negative terminal of the battery 132 is also grounded; therefore the solenoid becomes energized and draws the pivoted magnetic member 92 against the solenoid core. When this action takes place the levers 85, 83 and 81 move to the left. The swinging of the lever 83 to the left-hand side permits the brushes 106, which have up to now been held away from the commutator 118, to come in contact, thereby closing an electrical circuit from the positive terminal of the battery 132 through the motor to the ground, causing the said motor to rotate the drive shaft 26 and clutch member 30.

Due to the fact that the cam surface 79 in the lever 81 thrusts upwardly on the clutch operating lever 77 thereby throwing pressure against the right-hand clutch housing 50 friction is developed between the discs 54 and 57, causing the shaft 27 also to rotate with the drive shaft 26 and in the same direction. This causes the worms 47, worm gears 40 and pinions 44 to turn, raising the entire mechanism together with the window pane 12. If the finger lever 153 is released at any point of travel, the electrical circuit to the solenoid is opened, and the window pane 12 comes to rest at that point.

On the other hand, if the operator continues to hold down the finger lever 153 too long, the pin 179 on the motor case 23 contacts with the member 178, causing the slide member 155 to be pulled downwardly until the side 168 of the aperture 157 pulls the finger lever 153 back toward the position shown in Fig. 25, thereby opening the electrical circuit and bringing the electrical motor to a stop.

To reverse the direction of travel of the window pane 12 and return it to the original starting point, as shown in Fig. 1, the finger lever 153 is depressed in the slot 151, thereby causing the spring contact member 130 to contact the contacts G and H. This opens the electrical circuit through the solenoid 87, causing the magnetic member 92 to swing to the right-hand side. When this action takes place clutch member 30 stays in the same position as before, driving the clutch housing 50 because the cam surface 96 in the lever 81 is now lifting the lever 77, but the brushes on the commutator are now reversed, and the motor turns in the opposite direction, causing the apparatus to descend on the racks 16 and 17. Should the operator continue to hold down the finger lever 153 too long, the slide lever 155 is forced upwardly as the pin 179 on the motor casing 23 contacts the skid member 187. The side 167 now contacts the finger lever 153, pushing it upwardly into the position shown in Fig. 24, thereby opening the electrical circuit and bringing the motor to a stop.

The window pane 12 may be stopped at any point of travel either going up or going down, and the ventilator 14 may then be opened or closed as desired. In other words, the movement of the window pane 12 is independent of any position at which the window ventilator 14 may be located, and likewise the window ventilator 14 is independent in its movement of any position in which the window pane 12 is located; however, both the window pane and the ventilator are driven in reversible directions from the same electrical motor and motor drive shaft.

All of this is made possible by means of the diamond shaped aperture 93 located in the lever 81 and the four cam surfaces 94, 95, 96 and 97.

Having described the operation of the window pane in the upward and downward movements, we shall now describe the operation of the window ventilator which makes use of the same mechanism in a different manner and introduces the solenoid 70.

With the window ventilator 14 in a closed position, as shown in Fig. 1, and the window pane 12 at any position between the top and bottom limits of travel, we shall assume that it is desired to open the ventilator 14. The finger lever 153 is now pushed to the left-hand side in the slot 152; this causes the spider to tilt in the same direction, bringing the insulated member 127 against the contact member 126 and contacting the contacts A and B. By an inspection of the wiring circuit in Fig. 33 it will be seen that the solenoids 86 and 70 are now both energized. The solenoid 86 draws the pivoted magnetic member 72 to the left-hand side again as previously described, closing the electrical motor circuit through the brushes 106. The levers 85, 83 and 81 have again moved in the left-hand direction, but a different action now takes place with respect to the clutch operating lever 77. Instead of being pressed upwardly as when the window pane 12 was being operated, it is now pressed downwardly reversing the direction of pressure on the central clutch member 30. The clutch housing 49 is now engaged by the discs 54 and 57 in a similar manner as when the housing 50 was driven. This result is caused by the energizing of the solenoid 70 which draws the magnetic member 72 downwardly, thereby pivoting the lever 81 at the pivot 82 and bringing the pin 80 in the clutch operating lever in the upper field of the diamond-shaped aperture 93 located in the lever 81. As the lever 81 is in the left-hand position, the cam surface 95 is now engaging the top side of the pin 80 and throwing the clutch yoke member 78 to the left-hand side.

The worm 52 is now driven through the housing 49, causing the worm gear 59 to rotate and turn the shaft 61, which in turn rotates the pinion 64 and the gear 67 which is fixed to the ventilator shaft 66, thereby swinging said ventilator.

Should the operator hold the switch finger lever 153 in this position to the limit of travel of the ventilator or an instant longer, the link member 163 moves over from the solid line position shown in Fig. 12 to the right-hand dot-and-dash position, and as the link member 163 is attached to the slide member 154, the slide is pulled to the right until the side 161 of the aperture 156 contacts the finger lever 153 and pulls it back to a central and neutral position, as shown in Fig. 23, thereby opening the electrical circuit and stopping the movement of the ventilator 14. It will be further noted that the ventilator shaft 61 is provided with a key-way 63 throughout its entire length, so that the worm gear 59 may slide up or down on the shaft, or in other words, be located on the shaft 61 at any point at which the window pane 12 may be located with respect to the driving mechanism which is attached to the window pane frame.

If it be assumed that the operator wishes to reverse the direction of movement of the ventilator 14, he throws the finger lever over to the right-hand side in the slot 150; this contacts the spring contact member with the contacts E and F, thereby energizing the solenoid 70 again, together with the solenoid 87. The clutch operating lever 77 is still held down, and the lever 81 is now thrown to the right-hand side also reversing the brushes on the motor commutator 118, thereby reversing the motor and the driving mechanism to the ventilator 14. If the operator again holds the switch finger lever 153 too long, the gear 67 moves the link 163 to the left-hand dot-and-dash position, which in turn pushes the slide 154 to the left, causing the side 159 of the aperture 156 to engage the finger lever 153 and return it to a neutral position, as shown in Fig. 22, thereby opening the electrical circuit to the solenoids, which automatically opens the motor circuit because it lifts the brushes from the commutator.

In the electrical circuit shown here it should be borne in mind that at no time are there two sets of brushes in contact with the commutator, even though the electrical switch is open circuited, the brush contact with the commutator being had only when one of the solenoids 86 or 87 has been energized and not until such time. In other words, the closing of the electrical circuit through one of the solenoids 86 or 87 opens the circuit through the electrical motor. Also the brush lever 83 automatically returns to a central neutral position by means of the members 117 on the brush members 111 and 112, there always being a spring tension between the members, even in a neutral position.

One of the more important features involved in our invention is the lever 81 and the diamond-shaped opening 93 located therein. By means of the four cam surfaces 94, 95, 96 and 97 and the solenoid spring member 101 we are able to exert an upward or a downward pressure on the otherwise pivoted lever 81, thereby reversing the thrust of the clutch member 30 which drives the two worms 52 and 47. This arrangement makes it possible to reverse either the movement of the ventilator 14 or the window pane 12 with the same electrical motor. When the electrical motor is turning in one direction either the worm 52 or 47 will be turning, depending upon whether the solenoid 70 is electrically energized or not.

Another important feature of our invention lies in the construction and operation of the dual brush control to the electrical motor. In reversing the direction of rotation of the motor by using two sets of brushes, we eliminate more complicated switching arrangements, and at the same time it is to be noted that we also control the circuit to the electrical motor through the brushes by making the brushes act in the nature of a switch, or a pair of electrical switches. When the apparatus is at rest and the solenoids de-energized, the electrical motor brushes are always out of contact with the commutator of the motor. This control is effected through the lever 83 which has three important functions, the first of which is the neutral position which opens the brushes from electrical contact with the motor commutator and then the right and left-hand movement, which allows either one or the other set of brushes to contact the commutator. All of these features operate in combination with each other and thereby greatly simplify the wiring circuits and at the same time eliminate other electrical switches.

Another important arrangement in our invention is the arrangement of the clutch parts and housings which makes it possible to make use of two independent driving shafts, the main drive shaft 26 which is directly driven by the reversible electrical motor with the back drive to the worm 52 through which the drive shaft 26 rotates and the second drive shaft 27 which is in the same horizontal plane but which does not operate except when the clutch directly connects it up with the main drive shaft 26.

Due to the arrangements of the discs 54 and 57 in the clutch housings 49 and 50 a slight pressure to the right or left-hand side operates the housings 49 and 50 without any perceptible movement of the central clutch member 30. This arrangement in combination with the other elements of the mechanisms makes it possible to provide a very smooth movement of either the window pane 12 or the ventilator 14 in either direction and at the same time prevents shock at the end of the limits of movement in these moving parts.

The vertical sliding movement of the driving mechanisms on the slotted ventilator shaft 61 provides operation of either the ventilator 14 or the window pane 12 at any point with respect to each other without interference, either the window pane 12 or ventilator 14 being ready for action regardless of where the other may be.

In mounting the driving apparatus on the window pane frame we reduce much of the shock on the window mechanism to which automobile doors are subjected. This is important because it reduces the possibility of damage to apparatus of this type which otherwise would be more apt to occur where the driving apparatus is fixed in a permanent manner to the solid frame of the automobile door.

It is well understood in automobile window construction that the window pane, as 12, slides up and down in a felt cushioned slide-ways for the purpose of reducing shock and preventing accidental breakage of the glass. We make use of this same construction to protect the driving apparatus, as will be seen from an inspection of Fig. 1. The only direct contact the driving mechanism has with the solid portions of the automobile door is the racks 16 and 17 and the upper end of the ventilator 14 slotted shaft 61, both of which are more or less flexibly connected with said mechanism.

Another factor which we wish to mention is the fact that while we have shown the various mechanisms in a more or less experimental arrangement as to the shape and design of the various parts, yet it is to be understood that these parts may be more or less combined in actual production practice, thereby simplifying the construction. Also such shapes and arrangements may be modified for reasons of shop practice. It is, of course, understood that we are entitled to make such modifications while holding to the same functions without departing from the spirit of our invention.

Having thus described our invention, what we claim as new and desire to secure by Letters Patent, is:

1. In an improved electrically operated automobile door window pane and window ventilator, a reversible electrical motor and motor driven clutch mechanism connected with geared members attached to said window pane, one of said geared members engaging with a rack mounted in said door for the purpose of raising and lowering said window pane and another of said geared members slideably engaged with a rotatable member attached to said window ventilator, a friction clutch assembly, one side of said assembly being engageable with the window pane geared mechanism and the other side being engageable with the geared mechanism connected with said ventilator geared mechanism, and electrically operated means for reversing said clutch.

2. In an improved electrically operated automobile door window pane and window ventilator, a reversible electric motor and motor driven clutch mechanism connected with geared members attached to the said window pane, one of said geared members engaging with a rack mounted in said door for the purpose of raising and lowering said window pane and another of said geared members slidably engaged with a rotatable member attached to said window ventilator for the purpose of swinging said ventilator, a friction clutch assembly, one side of said assembly being engaged with the window pane geared mechanism and the other side being engaged with an operating member connected to said ventilator, and means for reversing said clutch assembly.

3. In an improved electrically operated automobile door window pane and window ventilator, a reversible electric motor and motor driven clutch mechanism connected with geared members attached to said window pane, one of said geared members engaging with a rack mounted in said door for the purpose of raising and lowering said window pane and another of said geared members engaged with a rotatable member attached to and adapted to pivot said window ventilator, a friction clutch assembly, means for engaging said clutch assembly with said geared mechanism to raise and lower said window pane and to provide a drive for said ventilator for the purpose of oscillating the pivot member of said ventilator, means for reversing said clutch assembly.

4. In an improved electrically operated automobile door window pane and window ventilator, a reversible electric motor and motor driven clutch mechanism connected with geared members attached to said window pane, one of said geared members engaging with a rack mounted in said door for the purpose of raising and lowering said window pane and another of said geared members slidably and rotatably engaged with a rotatable member attached to said ventilator for the purpose of oscillating said ventilator, a reversible clutch assembly connecting with said geared members, means for engaging said clutch with said window pane and ventilator geared members in an alternate manner.

5. In an improved electrically operated automobile door window and ventilator assembly comprising a reversible electric motor and clutch engaged with geared mechanism connected to said window, said mechanism engaging a rack attached to said door for the purpose of raising and lowering said window pane and a pivoted rod member attached to the said ventilator for the purpose of swinging said ventilator, a drive member slidably engaged on said rod member and keyed thereto, means for alternately engaging said clutch with said window and ventilator by means of geared mechanism for the purpose of raising and lowering the said window pane and swinging said ventilator.

6. In an improved electrically operated automobile door window and ventilator assembly comprising a reversible electric motor and clutch engaged with geared mechanism connected to said window, said mechanism engaging a rack attached to said door for the purpose of raising and lowering said window and a pivoted rod member attached to the said ventilator for the purpose of swinging said ventilator, said rod member being oscillated by means of a sliding gear member keyed to said rod and driven from one of said geared members by means of an electric motor and clutch assembly.

DANIEL L. CHANDLER.
GEORGE W. EWING.